United States Patent
Mueller

(10) Patent No.: US 6,318,336 B1
(45) Date of Patent: Nov. 20, 2001

(54) INTAKE PORT FOR AN INTERNAL-COMBUSTION ENGINE

(75) Inventor: Stephan Mueller, Leonberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/208,855

(22) Filed: Dec. 10, 1998

(30) Foreign Application Priority Data

Dec. 10, 1997 (DE) .............................................. 197 54 736

(51) Int. Cl.⁷ ...................................................... F02B 31/00
(52) U.S. Cl. .............................................................. 123/306
(58) Field of Search ................................ 123/306, 188.14

(56) References Cited

U.S. PATENT DOCUMENTS

| | | | |
|---|---|---|---|
| 4,174,686 | * 11/1979 | Shimizu et al. | 123/188.14 |
| 4,196,703 | * 4/1980 | Okitsu et al. | 123/188.14 |
| 4,256,062 | * 3/1981 | Schafer | 123/188.14 |
| 4,320,725 | * 3/1982 | Rychlik et al. | 123/188.14 |
| 4,336,776 | * 6/1982 | Sumiyoshi et al. | 123/188.14 |
| 4,523,559 | * 6/1985 | Latsch et al. | 123/306 |
| 4,827,883 | * 5/1989 | Khalighi et al. | 123/306 |
| 5,277,160 | * 1/1994 | Choma et al. | 123/306 |
| 5,551,392 | * 9/1996 | Yamaji et al. | 123/188.14 |
| 5,553,590 | * 9/1996 | Suzuki et al. | 123/188.14 |
| 5,632,244 | * 5/1997 | Endres et al. | 123/306 |
| 5,640,941 | * 6/1997 | Hazen et al. | 123/306 |
| 5,979,401 | * 11/1999 | Hickey | 123/306 |

FOREIGN PATENT DOCUMENTS

| | | |
|---|---|---|
| 4437279A1 | 4/1995 | (DE) . |
| 19511136 | 5/1995 | (DE) . |

\* cited by examiner

Primary Examiner—John Kwon
(74) Attorney, Agent, or Firm—Crowell & Moring LLP

(57) ABSTRACT

An intake port for an internal-combustion engine is composed of an inlet duct which is constructed in the cylinder head and has a more curved section close to the combustion space and a flat or less curved section away from the combustion space. The inlet duct is adjoined by an intake connection piece which is fastened to the cylinder head and is connected wit the intake system. In the intake port formed of the intake connection piece and the inlet duct, a guiding device is constructed which is arranged in the inlet duct and extends into the more curved area of the inlet duct. The guiding device includes a movable section to differently guide the inlet duct flow as a function of engine operating conditions.

25 Claims, 3 Drawing Sheets

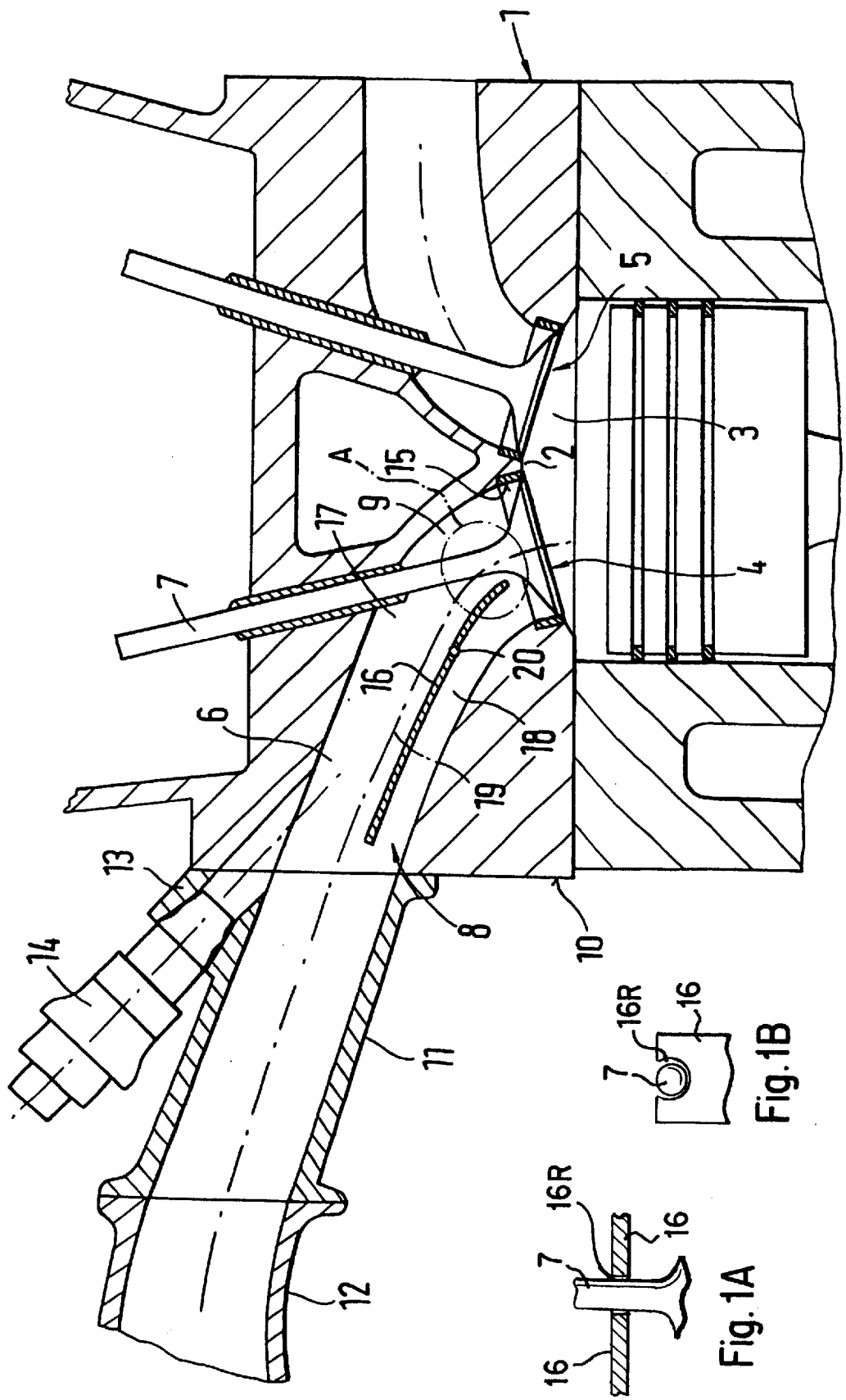

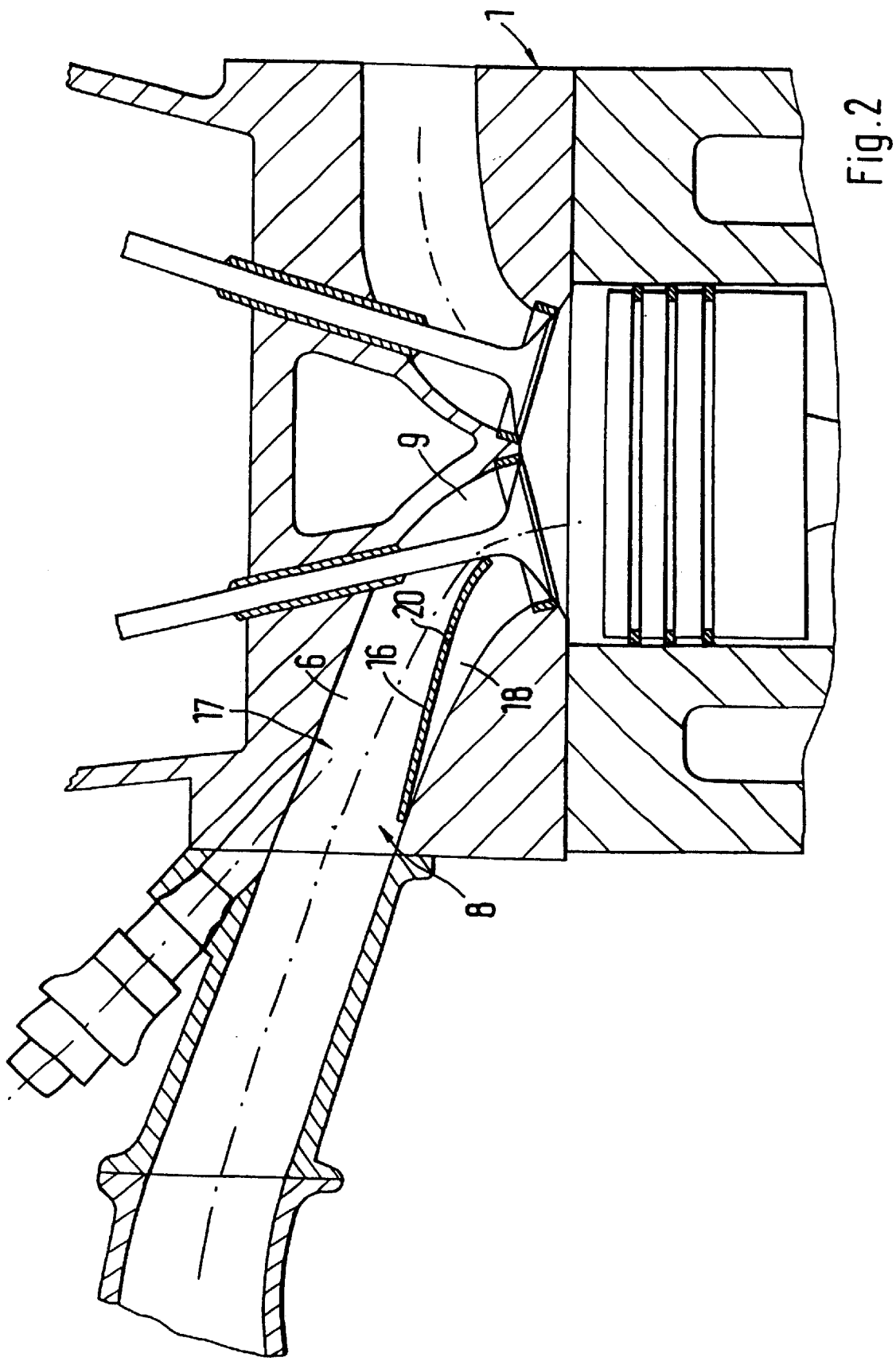

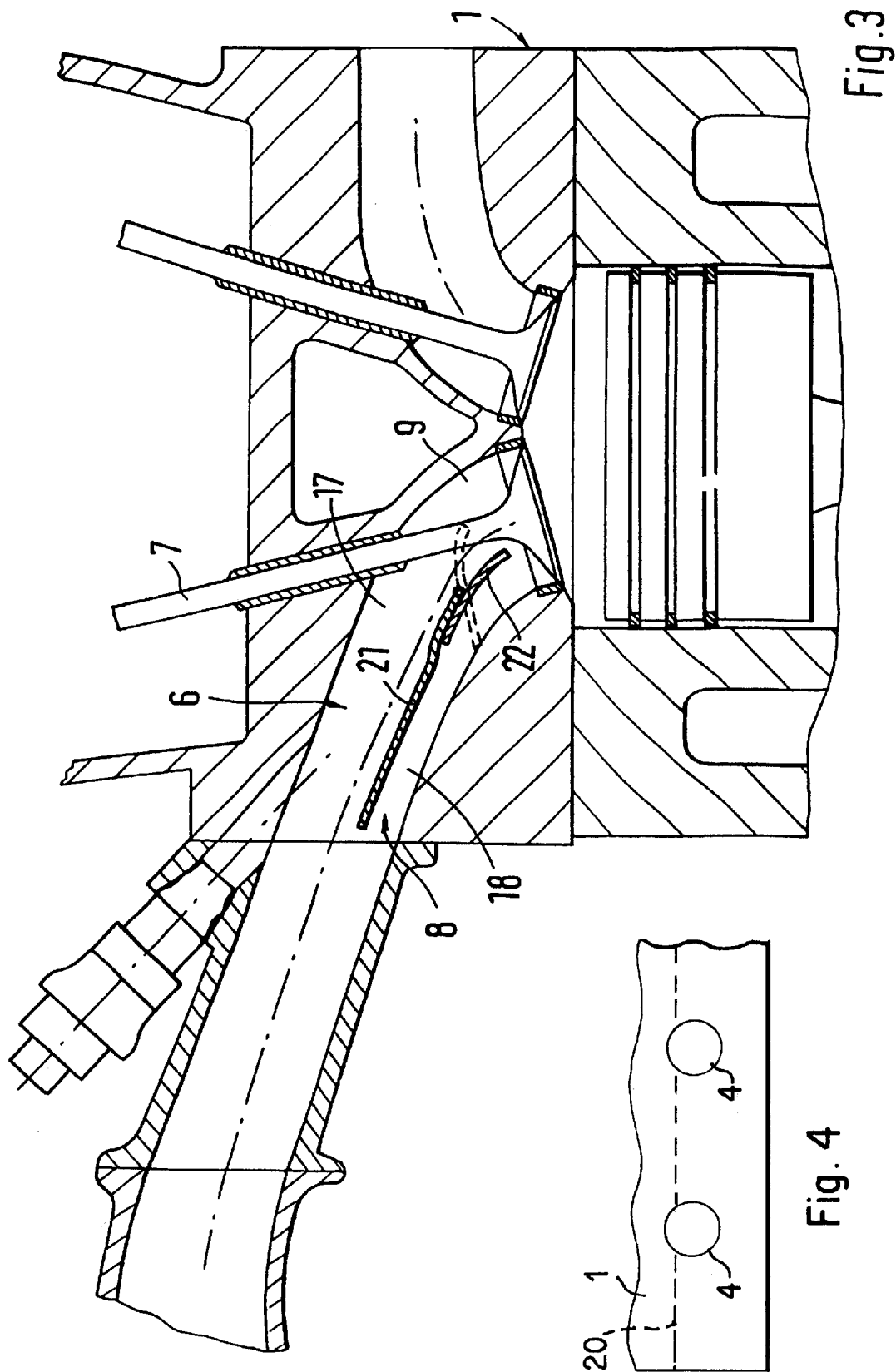

INTAKE PORT FOR AN INTERNAL-COMBUSTION ENGINE

BACKGROUND AND SUMMARY OF THE INVENTION

This application claims the priority of German application 197 54 736.2, filed in Germany on Dec. 10, 1997.

The invention relates to an intake port for an internal-combustion engine. Especially preferred embodiments relate to an intake port for an internal-combustion engine which has a combustion space which is at least partially constructed in a cylinder head and which, by way of at least one valve-controlled inlet duct leading into its roof section, is acted upon with air or with a fuel air mixture, the inlet duct constructed in the cylinder head having a more curved section facing the combustion space and a less curved section away from the combustion space, and changing into an intake connection piece adjoining the cylinder head, which intake connection piece, together with the inlet duct forming the intake port and being connected with the intake system, and having a guiding device arranged in the intake port and having an adjustable guiding section.

An intake port of this type is described, for example, in German Patent Document DE 44 37 279 A1 and is composed of an inlet duct constructed in the cylinder head and of an intake connection piece flanged to the cylinder head, which intake connection piece is connected with the intake system of the internal-combustion engine. In the intake connection piece, a receiving device for an injection nozzle is constructed whose fuel jet is directed into the inlet duct. Furthermore, a guiding device with a swivellable guiding section is arranged in the intake connection piece, which guiding section is constructed on the side of the guiding device facing away from the cylinder head. This guiding device is arranged such in the intake connection piece that it projects into the entrance area of the inlet duct. In addition to the defined port geometry, this guiding device has the purpose of causing, in the case of a low engine load—idling and partial load—a targeted tumble in the combustion space. However, such guiding devices have the disadvantage that they have a throttling effect at higher rates of air flow in the nominal output range and thus counteract an optimal port construction for the nominal output range. Furthermore, in the case of such intake port geometries, detachments of the flow on the port section inside the curvature will occur in the area of the more curved inlet duct section so that this also has a disadvantageous influence on the mixture preparation in the nominal output range.

With respect to the above, it is an object of the invention to improve an intake port of the above-mentioned type for an internal-combustion engine such that, at low air rates of air flow in the idling and partial load range, the mixture preparation is improved by the targeted tumble generating in the combustion space and simultaneously a higher and more uniform rate of air flow in the nominal output range of the internal-combustion engine is ensured.

According to the invention, this object is achieved by providing that the guiding device is arranged in the inlet duct and, by means of its area close to the combustion space, reaches at least approximately into the more curved section of the inlet duct.

By the arrangement of the guiding device in the inlet duct and the dimensioning of the guiding device into the more curved section of the inlet duct close to the combustion space, as a function of the position of the adjustable guiding section, a targeted tumbling formation can be caused as well as a stabilizing of the flow at higher rates of air flow. Particularly at high rates of air flow in the normal output range, this arrangement of the guiding device contributes to a stabilizing of the flow by way of the port cross-section and can furthermore counteract separations of the flow at the port section on the inside of the curvature. By means of such an arrangement of the guiding device, an improvement of the mixture preparation can therefore be achieved along almost the whole usage range of the internal-combustion engine, during idling and in the partial load range, a combustion-promoting tumbling formation being promoted and, at higher rates of air flow in the nominal load range, a targeted flow and a high rate of air flow being achieved.

The generating of a tumbling in the combustion space for improving the mixture preparation during idling and in the partial load range becomes particularly effective if the adjustable guiding section of the guiding device is constructed on the part of the guiding device close to the combustion space. As a result, particularly in the more curved section of the inlet duct, an effective diversion or deflection of the air flow can be achieved, without any weakening of the flow effect caused by the guiding device by disturbing influences from the port geometry.

By the construction of the guiding device as a baffle and the adaptation of this baffle to the course of the curvature of the inlet duct in the flow direction, particularly for high rates of air flow, a particularly effective stabilizing of the flow can be achieved along the whole port cross-section and particularly at the port section on the inside of the curvature.

A particularly advantageous construction of the guiding device is achieved for multi-cylinder internal-combustion engines if the adjustable guiding section is operated by means of a swivelling axis or swivelling shaft penetrating the inlet duct, and this swivelling axis or swivelling shaft is arranged in parallel to the longitudinal course of the internal-combustion engine. By means of this arrangement, the swivelling axis or swivelling shaft can be constructed such that, in one piece, it penetrates the respective inlet ducts situated behind one another, and the adjustable guiding sections of all cylinders arranged behind one another are therefore adjustable by means of an operating element.

A particularly good tumble formation is achieved if the guiding device divides the inlet duct into an upper and a lower guiding section or into a guiding section on the outside and on the inside of the curvature and, for the tumble formation in the combustion space, the lower guiding section or the guiding section on the inside of the curvature is largely closed.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional schematic view of an intake port of an internal-combustion engine constructed according to a preferred embodiment of the present invention;

FIG. 1A schematically depicts a modified embodiment with a recess in a baffle surrounding an inlet valve stem; and FIG. 1B is a sectional schematic plan view showing the arrangement of FIG. 1A;

FIG. 2 is a view of this intake port in a second switching position of the adjustable guiding section;

FIG. 3 is a view similar to FIGS. 1 and 2, showing another preferred embodiment of the invention with a modified guiding device; and FIG. 4 is a schematic view depicting a multi-cylinder arrangement according to the invention.

DETAILED DESCRIPTION OF THE DRAWINGS

In FIG. 1, the cylinder head of a multi-cylinder internal-combustion engine has the reference number 1, the charge cycle of this internal-combustion engine 1 being controlled by four charge cycle valves per cylinder. In the cylinder head 1, the roof section 2 of the combustion space 3 is constructed for each cylinder. Two circular inlet openings respectively and two also circular outlet openings are constructed in this roof section, of which only one inlet 4 and one outlet 5 are shown here. Each inlet opening is simultaneously the mouth section of an inlet duct 6 which is constructed in the cylinder head and which is penetrated by an inlet valve 7 interacting with the inlet opening. This inlet duct 6 has a section 8 which is away from the combustion space and the course of whose axis has a straight or only slightly curved construction. This section 8 away from the combustion space changes into a more curved section 9 close to the combustion space, which more curved section leads into the combustion space 3. The section 8 away from the combustion space reaches to a side surface 10 of the cylinder head and changes there to an intake connection piece 11 which is flanged to the cylinder head 1 and which is connected with the only partially illustrated intake system 12. Further, a receiving device 13 for an injection valve 14 is constructed on the intake connection piece 11 and is arranged in the upper area of the intake connection piece facing away from the combustion space. The injection valve 13 is arranged such in a manner known per se that the generated fuel jet enters into the inlet duct 6 in the upper area of the inlet duct 6 and the jet axis is aligned with the center of the inlet opening 15. However, it is also easily possible to construct the internal-combustion engine as a direct-injecting internal-combustion engine, in which case then the injection valve is arranged such on the cylinder head that the fuel jet is entered directly into the combustion space 3.

Along a major and important portion of its length, the inlet duct 6 is divided into an upper port section 17 and into a lower port section 18 by means of a guiding device constructed as a baffle 16. This baffle 16 is curved in the direction of the flow course, the line of curvature following largely the course of the inlet duct axis 19. Perpendicularly to the flow direction or perpendicularly to the intersection plane illustrated in FIG. 1, the baffle 16 is constructed to be approximately planar. The baffle 16 is arranged such that it extends below the port axis 19, and the upper port section 17 and the lower port section 18 have a cross-sectional surface ratio of approximately two to one.

The baffle is fastened on a swivelling shaft 20 penetrating the inlet duct 6, the rotation of this swivelling shaft 20 being able to change the position of the baffle. The swivelling position of the baffle illustrated in FIG. 1 is designed for the operation of the internal-combustion engine at high rates of air flow in the nominal output range. The alignment of the baffle is such that the air flow encounters only very little resistance, and the air flow takes place via the upper port section 17 and the lower port section 18. By means of this division of the inlet duct, a separation of the flow is prevented particularly in the area of the lower port section in the area of the most pronounced port curvature.

In the case of the switching or swivelling position of the baffle 16 illustrated in FIG. 2, the lower port section 18 is largely closed in that the end of the baffle facing away from the combustion space rests against the port wall. Simultaneously, the flow cross-section of the upper port section tapers along the length of the port. This change of the port cross-section promotes a targeted tumbling formation in the combustion space during idling and in the partial load operation of the internal-combustion engine.

In the modification of the embodiment illustrated in FIG. 3, the baffle 21 is fixedly arranged in the inlet duct 6. By means of this fixed baffle 21, the inlet duct 6 is also divided into an upper port section 17 and a lower port section 18; the surface ratios of the upper port and lower port duct sections 17, 18 correspond to those of the first embodiment. In this modification, the baffle 21 ends in the area of the transition from the less curved section 8 to the more curved section 9 of the inlet duct 6. At the end of the fixed baffle 21, a swivellable guiding section 22 is disposed which extends into the proximity of the inlet valve 7. In the alignment of the swivellable guiding section 22 indicated by a solid line, the fixed baffle 21 is lengthened by section 22 in an aligned manner. This switching or swivelling position of the swivellable guiding section is provided for the operation of the internal-combustion engine with a high rate of air flow-as described above. For the operation of the internal-combustion engine during idling and in the partial load range, the swivellable guiding section 22 is swivelled into the position illustrated by a broken line so that this guiding section 22 will rest against the lower port wall of the inlet duct 6 and close the lower port section 18 and simultaneously will reduce the passage cross-section of the upper port section 17. This swivelling position again promotes the tumbling formation in the combustion space.

In the case of the construction and arrangement of the guiding device, it is easily possible to let this guiding device project in the area close to the combustion space into the area of the inlet valve. For example, the valve stem of the inlet valve can then be surrounded by a corresponding recess in the baffle 16 or in the swivellable guiding section 22. This recess, which is schematically depicted in FIGS. 1A and 1B, must them be constructed such that the valve stem of the inlet valve is surrounded without any contact in all swivelling positions of the baffle 16 or of the swivellable guiding section;

FIG. 1A schematically depicts section A from FIG. 1, with a modified embodiment having a recess 16R which can reach around the valve stem 7. FIG. 1B shows the arrangement of FIG. 1A in a sectional plan view from above.

FIG. 4 schematically depicts an arrangement with multiple cylinders with a single swiveling shaft 20 extending through inlet ducts 4 of respective adjacent aligned cylinders arranged behind one another, to thereby provide for a common operating element for adjusting the adjustable guiding sections of all of the cylinders.

In contrast to the illustrated use, an intake port having such a guiding device is particularly suitable for internal-combustion engines with a direct gasoline injection, in which a mixture preparation on the hot inlet duct walls is not required in contrast to the intake pipe injection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. Intake port for an internal-combustion engine which has a combustion space which is at least partially con- structed in a cylinder head and which, by way of at least one valve-controlled inlet duct leading into its roof section, is acted upon with at least one of air and a fuel air mixture, the inlet duct constructed in the cylinder head having a first curved section facing the combustion space and a second curved section upstream of the first curved section, said first curved section being more curved than said second curved section, said second curved section joining an intake connection piece adjoining the cylinder head, which intake connection piece, together with the inlet duct, forming the intake port and being connected with an intake system, and having a guiding device arranged in the intake port, wherein the guiding device is arranged in the inlet duct and, by means of its area close to the combustion space, reaches at least approximately into the more curved section of the inlet duct, wherein at least an area of the guiding device close to the combustion space is constructed as a movable adjustable guiding plate section, wherein the guiding device divides the intake port into an upper port section and a lower port section, and wherein the adjustable guiding plate section is operable to substantially completely close the lower port section.

2. Intake port for an internal-combustion engine according to claim 1, wherein the guiding device is constructed as a baffle which is curved with a line of curvature following a course of an inlet duct axis.

3. Intake port for an internal-combustion engine according to claim 1, wherein the adjustable guiding plate section is constructed as a swivellable flap and is disposed on a swivelling axis penetrating the inlet duct.

4. Intake port for an internal-combustion engine according to claim 3, wherein the internal-combustion engine has at least two cylinders arranged in a longitudinal row along the cylinder head, each having at least one intake port and one guiding device respectively, and wherein the swivelling axes are aligned in parallel to a longitudinal course of the internal-combustion engine.

5. Intake port for an internal-combustion engine according to claim 3, wherein the guiding device divides the intake port into an upper port section and a lower port section, wherein the adjustable guiding plate section is operable to almost completely close the lower port section, and.

6. Intake port for an internal-combustion engine according to claim 2, wherein the adjustable guiding plate section is constructed as a swivellable flap and is disposed on a swivelling axis penetrating the inlet duct.

7. Intake port for an internal-combustion engine according to claim 6, wherein the internal-combustion engine has at least two cylinders arranged in a longitudinal row along the cylinder head, each having at least one intake port and one guiding device respectively, and wherein the swivelling axes are aligned in parallel to a longitudinal course of the internal-combustion engine.

8. Intake port for an internal-combustion engine according to claim 6, wherein the whole guiding device is adjustably moveable.

9. Intake port for an internal-combustion engine according to claim 6, wherein the adjustable guiding plate section is operable to almost completely close the lower port section.

10. Intake port for an internal-combustion engine according to claim 6, wherein an injection nozzle is arranged on the inlet duct such that it admits fuel to the upper port section.

11. Intake port for an internal-combustion engine according to claim 2, wherein an injection nozzle is arranged on the inlet duct such that it admits fuel to the upper port section.

12. Intake port for an internal-combustion engine according to claim 1, wherein the whole guiding device is adjustably movable.

13. Intake port for an internal-combustion engine according to claim 1, wherein the guiding device divides the intake port into an upper port section and a lower port section, and wherein the adjustable guiding plate section is operable to almost completely close the lower port section.

14. Intake port for an internal-combustion engine according to claim 13, wherein control means are provided to maintain the swivellable guiding plate section with said upper and lower port sections open when the engine is operated in a normal output range and to move the swivellable guiding plate section substantially inducing tumbling to flow of intake air to the combustion space during idling and partial load range operation of the engine.

15. Intake port for an internal-combustion engine according to claim 1, wherein an injection nozzle is arranged on the inlet duct such that it admits fuel to an upper port section.

16. Intake port for an internal-combustion engine according to claim 1, wherein said adjustable guiding plate section includes a predetermined cutout opening which partly surrounds a part of an inlet valve so as to permit adjusting movement of the guiding plate section and inlet valve during operation of the engine.

17. An intake flow guide arrangement for an intake duct in an internal combustion engine cylinder head, the intake duct having a first curved section facing an engine combustion space and a second curved section upstream of the first curved section with said first curved section being more curved than said second curved section, said intake flow arrangement comprising:

a guiding device arranged in the intake duct which extends into the first curved section of the intake duct and has an adjustable guiding plate section which is movable between a nominal engine operating range with minimal blocking of flow in the intake duct and an idling and partial load engine operating range with more blocking of flow while inducing tumbling flow of intake air to an engine combustion space, wherein the guiding device divides the intake port into an upper port section and a lower port section, and wherein the adjustable guiding plate section is operable to substantially completely close the lower port section.

18. An intake flow guide arrangement according to claim 17, wherein the adjustable guiding plate section is pivotal between adjusting positions about an axis extending longitudinally of an engine having longitudinal spaced plural combustion spaces in the cylinder head.

19. An intake flow guide arrangement according to claim 18, wherein the adjustable guidinq plate section is part of a unitary plate.

20. An intake flow guide arrangement according to claim 18, wherein the adjustable guidinq plate section is a movable baffle plate at a downstream end of an upstream fixed plate of the guiding device.

21. An intake port for an internal-combustion engine according to claim 17, wherein the adjustable guiding plate section is constructed as a swivellable flap and is disposed on a swivelling axis penetrating the inlet duct.

22. An intake port for an internal-combustion engine according to claim 17, wherein the guiding device divides the intake port into an upper port section and a lower port section, wherein the adjustable guiding plate section is operable to almost completely close the lower port section.

23. An intake port for an internal-combustion engine according to claim 22, wherein an injection nozzle is arranged on the inlet duct such that it admits fuel to the upper port section.

24. An intake port for an internal-combustion engine according to claim 23, wherein said adjustable guiding plate section includes a predetermined cutout opening which partly surrounds a part of an inlet valve so as to permit adjusting movement of the guiding plate section and inlet valve during operation of the engine.

25. Intake port for an internal-combustion engine according to claim 2, wherein the adjustable guiding plate section is operable to almost completely close the lower port section.

* * * * *